May 24, 1960        W. A. GREIG        2,938,165

METHOD AND APPARATUS FOR TESTING METERS

Filed March 12, 1956        2 Sheets-Sheet 1

INVENTOR.
WALTER A. GREIG
BY Whittemore, Hulbert
Belknap
ATTORNEYS

May 24, 1960  W. A. GREIG  2,938,165
METHOD AND APPARATUS FOR TESTING METERS
Filed March 12, 1956  2 Sheets-Sheet 2
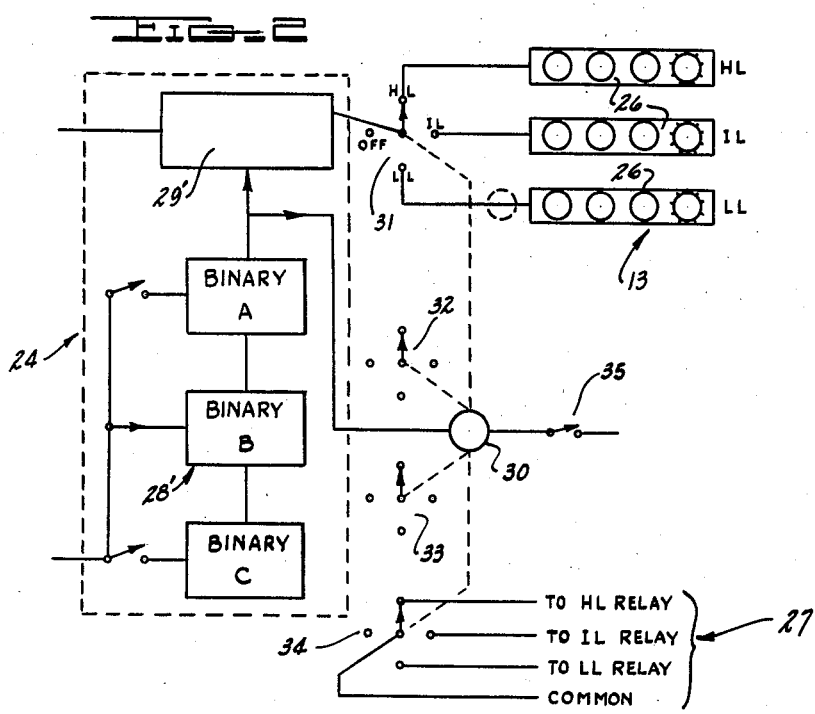
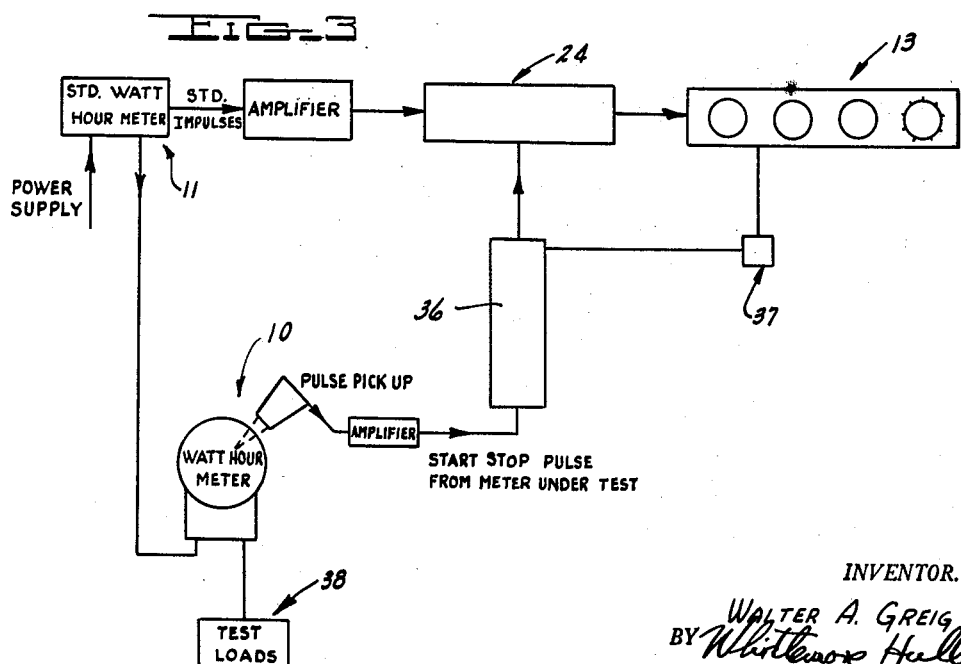
INVENTOR.
WALTER A. GREIG
BY *Whitmore, Hulbert*
*Belknap*
ATTORNEYS United States Patent Office 2,938,165
Patented May 24, 1960

2,938,165

METHOD AND APPARATUS FOR TESTING METERS

Walter A. Greig, Detroit, Mich., assignor to The Detroit Edison Company, Detroit, Mich., a corporation of New York Filed Mar. 12, 1956, Ser. No. 570,741

2 Claims. (Cl. 324—74)

The present invention relates to an improvement in procedure and apparatus for the testing of meters and like indicating and/or recording instruments, of which an electric watthour meter is the type chosen for illustration.

It is a general object of the invention to provide a novel method and apparatus to enable an accurate check of the accuracy of such a meter to be made very quickly indeed, by comparison with the existing procedure. This is done with precision in as little as one revolution or less of the meter dial or indicator. In fact, the invention makes it possible to conduct the complete test automatically, under three different kinds of load, in a space of time of the order of a minute for the current style meter, covering all three tests, light, inductive and heavy load, and with a precision of plus or minus 0.1%, with greater precision possible. In accordance with the invention, a reference check is made entirely automatically against a standard similar meter, or equivalent standard device whose accuracy is established and whose disk travels in a nominal speed ratio of 1:1 with that of the tested meter, and is taken in only one revolution of the usual rotating disk of the meter under test.

The apparatus will, it is believed, make obsolete the present widely followed visual procedure of testing watthour meters for accuracy, which involves the visual comparison of the reading of a meter being tested, over the interval of a considerable number of rotations of its disk, or over some other arbitrary period, with that of a standard meter whose accuracy is established. The percentage of error in the test meter is then computed on this basis. The procedure is unduly time consuming, as well as unreliable as involving the factor of human error.

Consequently various automatic arrangements have been proposed, relying on stroboscopic viewing of the meter under test with the assistance of photoelectric circuitry. Others propose the use of electronic cathode beam equipment, with extensive and involved parts and wiring in association; while still other suggested systems employ complicated motor controls to drive a register or counter from which the operation of the suspected meter may be checked for accuracy.

All of the previously relied on and proposed test systems or procedures are found lacking in respect to the reliability and speed with which the desired ultimate result (i.e., and a direct and precise reading of percent accuracy in a one-revolution time period) may be had, as well as in reference to the complexity and consequent high cost of the equipment required to give the result, and in other respects.

It is a further and more specific object of the invention to provide a simplified procedure and apparatus for checking watthour meters, and the like, by a reading of percentage relative accuracy with reference to a standard instrument which originates rapid "measuring" impulses. In the apparatus as constructed, and assuming the standard instrument is properly adjusted, each revolution of the standard represents a certain amount of energy in watthours (according to the range selected) and each impulse represents 1/1000 of this amount. In an application in which the speed of the meters is held constant by regulating the load, the measuring impulses will be equally spaced in time and may therefore be considered as timed impulses. The reading as to percent accuracy is taken directly from a counting and indicating unit of the apparatus, which is timed as to its cycle of operation by the tested meter. This reading may be had after no more than a single revolution or two of the tested meter's rotating disk.

A still more specific object is to provide a method and apparatus in which the desired direct reading is registered on the indicator by the subtractive operation of its counter mechanism, illustrated herein as an electronic computer of the cold cathode decimal counter glow tube type. Other types of counter suitable for inverted or subtractive operation, and above all of adequate capacity in respect to counting speed, may suggest themselves to those skilled in the art.

Yet another object is to provide a method and apparatus in which similar operations of testing a meter successively under different types of load are carried out automatically by relay or like switching provisions asssociated with the counter unit, whereby upon completion of a test cycle under one type of load, a test cycle under another type will be automatically initiated.

In the attainment of the ends mentioned above, the test apparatus of the invention comprises a combination of but three essential units or devices. These are: (a) a standard generator of timing impulses, which will ordinarily be a standard watthour meter of established accuracy equipped with a special impulse timing disk which is viewed photoelectrically to originate the desired impulses, and a frequency multiplier is preferably connected in the photoelectric output line; (b) a further photoelectric viewing and gate or trigger circuit which is controlled as to its origination of "start" and "stop" signal impulses by the rotating disk of the meter under test; and (c) a counter of the type mentioned in the preceding paragraph whose operation to count impulses received by it from the standard impulse generator is governed as to duration by the "start"-"stop" gate or trigger signals originated and controlled at the meter being tested.

The foregoing as well as other objects of the invention will become more apparent as this description proceeds, especially when considered in connection with the accompanying drawings, wherein:

Fig. 2 is a schematic layout of a switching or staging arrangement for automatically performing successive test cycles under different types of load; and Fig. 3 is a schematic block diagram of a simplified, one revolution test setup suitable for laboratory testing, polyphase meter testing, or portable use in field testing.

Figure 1:
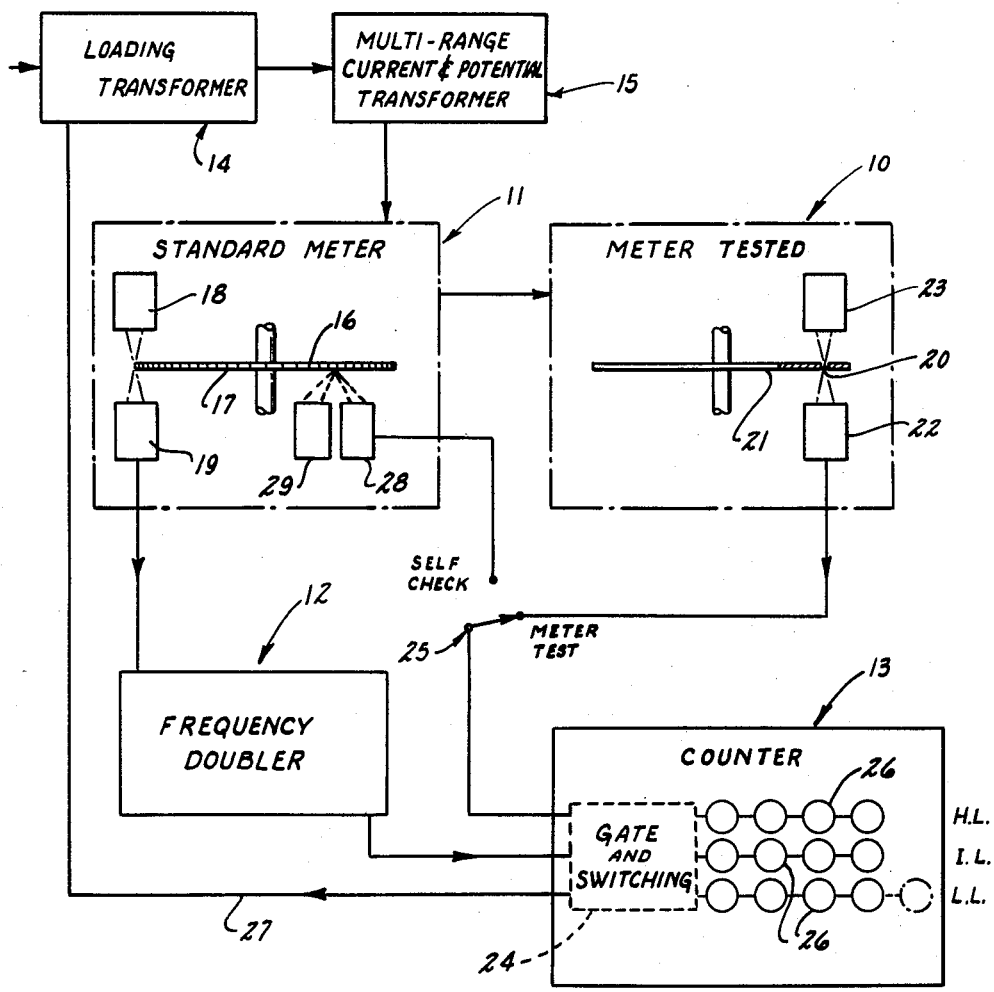
Fig. 1 is a schematic layout showing major operating components of the improved apparatus and, in a general way, wiring connecting the same.

In line with the intent of the invention to establish an accurate check of the meter 10 in as little as one rotation of its disk, there is provided a pulse counter (hereinafter described) capable of counting at speeds far in excess of the ability of mechanical or mechanico-electromagnetic counters or registers heretofore employed for a similar purpose. Inherent restrictions as to speed of operation are imposed by mechanical and/or electric relay and counter features of such systems which limit the same to counting at rates in the order of 10 counts per second, and not faster in a marked degree.

In contrast, the single rotation testing of a meter 10 at its fastest, full load speed must take place in a period ranging from a minimum duration of about 1.8 seconds (the normal operating speed) to about 6 seconds.

As shown in Fig. 1 the meter unit to be tested is generally designated 10, the standard or comparison meter unit is designated 11, and its associated frequency doubler 12. It is to be understood that the device 12 may embody appropriate provisions for the amplification and shaping of pulses of uniform aptitude and short duration, as originated at standard 11. Similar signal amplifying and shaping means may be associated in the output line of the tested meter 10 which forwards "start"—"stop" signals.

The counter unit is indicated at 13. This is an electronic counter of the known cold cathode decimal counter tube type, selected because of its ability to register with adequate speed, as illustrated by the fact that it will receive a nominal 1,000 timing impulses in a single revolution of the standard meter 11.

This signifies that the counter 13 must count from a maximum rate of 1000 impulses in a 1.8 second interval of rotation of the tested and standard meter, or 556 pulses per second, to a slower rate of 167 pulses per second in the testing of a meter whose rotation takes 6 seconds. The electronic counter 13 is capable of doing this with ease. However, it is contemplated that any counter unit other than a mechanical type having adequate capacity in respect to speed, by reason of existing or future development, may be employed in accordance with the principle of the invention. By this it is meant that a mechanical counter of known type, limited to a counting rate of even 100 counts per rotative cycle of the duration of that of the control standard employed in the present system, that is at a rate of, say, 56 counts per second, will not serve. Testing apparatus embodying such counting equipment requires up to twenty revolutions of the tested meter disk to give a reading.

These figures are those involved in the testing of meters of which there are perhaps millions in service, and which have but recently been superseded by a later type operating at half the above-mentioned speed, so that the overall time consumed in making a three load test, including time lost in starting and between different load runs, may be somewhat but not significantly greater than the one minute interval mentioned above. It follows, therefore, that a complete three load test of the older type meter can be made in the order of one-half minute.

Power is supplied to the apparatus through a loading transformer 14 and further multi-range transformer 15 of known type. This unit is capable of selectively loading meters of a considerable range in size, i.e., from 2½ amperes to 50 amperes. It is appropriately correlated to operate with the counter unit 13, or in any other appropriate fashion. It is contemplated that each meter 10 shall be tested in reference to three types of loads, i.e., 100 percent or heavy load, inductive load, and light, or, say, 10 percent load. The standard meter 11 is equipped with a modified rotating disk 16 which has 500 notches, apertures, lines or like light-interruptive markings or formations thereon, conventionally designated 17. These interrupt, either reflectively or transmissively, a light beam from a source 18, causing electronic impulses to be generated in a photoelectric device 19 at the rate of 500 impulses for each revolution of the disk 16. These impulses are fed to the frequency doubler unit 12, a unit of well known type, by which they are amplified to 1,000 per revolution, and, if desired, the unit 12 may also incorporate provisions to alter the form of the impulses, which are then fed from the frequency doubler 12 to the counter unit 13.

The meter 10 under test is viewed at the conventional internal aperture 20 of its rotating disk 21 by a photoelectric device 22, a light source 23 being in opposed relation. Thus the photoelectric unit 22 will originate two pulses per revolution of the disk 21 of the meter 10 under test, or one revolution, in some disk arrangements known to the art.

These impulses are fed to an electronic gate 24 of the counter unit 13, as are the timing impulses of standard meter 11; and it is the function of the gate 24 to utilize the set of impulses for each revolution of the test meter 10 to initiate and terminate a counting interval, during which the unit 13 counts and records electronically the number of impulses it receives from standard meter 11 through the frequency doubler 12.

It is desirable to connect the manual switch 25 in the line from the test meter to the counter gate 24, for the purpose of disconnecting this circuit and connecting the standard meter 11 with counter 13, in order ot permit a check of the latter.

It will be seen that, with the electronic gate controlled by pulses from test meter 10, as by variably biasing a control grid of the gate, to be "open" for exactly one revolution of the meter 10, a nominal count of 1,000 impulses from the standard meter 11 will be recorded by counter 13 in that interval. This count is inversely proportional to accuracy, approximately.

The counter 13 has three banks of cold cathode counter tubes 26 in decades fed by the gate 24, i.e., for heavy load, inductive load and light load testing. The decades register units, tens, hundreds and thousands in a known way, the reading being taken off by observing the cathode glow from the end of each tube. The bank of tubes for light load testing is equipped with an extra decade, shown in dotted line, which will actually be ignored when taking a reading.

The counting impulses applied to the respective banks of tubes 26, as selected at the multi-range current and potential transformer unit 15, inversely proportional in respect to the desired direct reading or percentage accuracy, are converted in recording the count by arranging each bank or set of counter tubes 26 to be reset to 2,000, instead of to 0, and by connecting the tubes to subtract instead of add. In the case of the light load test bank, the same is reset to 20,000.

The counter 13 also acts as an automatic range switching device. To this end it controls the loading transformer device 14 by transmitting an impulse to it through a conventionally shown connection 27 at the end of each load test, which impulse acts through relays (not shown) to change the load to the next required load.

Thus, in any range setting, and in the subtractive hookup described, a nominal count of 1,000 registered on unit 13 is subtracted from 2,000, leaving a nominal reading of 1,000, which may be read as 100.0% accuracy of the tested meter by the addition of a decimal point. It is seen that a meter 10 which is 1% slow will permit 1,010 pulses to be subtracted from the 2,000 readings leaving a reading of 990, or 99.0%.

Reference has been made to the use of the switch 25 to enable a check of the standard 11. Actually, this is a check of the proper pick-up of the measuring impulses at the standard meter, the operation of the gate and switch 24 and the operation of the counter tubes 26. It may be had, once per revolution of meter 11 when switch 25 is at the self check position, by the provision of a further photoelectric unit 28 positioned to receive a beam from a light source 29 reflected from the standard disk 16, this beam being interrupted once per revolution by a non-reflective disk portion.

The operation of the system, it is believed, requires no further description. Its parts are relatively few, its operation is accurate and reliable, a complete check being made in the interval of a single revolution of the test meter 10. Complex and expensive motor arrangements are avoided. Necessary relay or like provisions for automatically distributing successive counts to different counter banks will suggest themselves to those skilled in the art, and the arrangement of the apparatus may differ in different installations. For example, the conventional watthour meter ordinarily having two diametrically opposed disk apertures 20 will produce two photoelectric output pulses per revolution of the disk 21. It is necessary to count for either one or two complete revolutions, and provisions to this end are desirably incorporated in the gate device 24 of the counter, including binary resets, for example, in order to permit starting of each count at the commencement of the succeeding half revolution. The invention is not specifically directed to the means provided for these purposes.

A so-called subtractive operation of the counter unit 13 is an easy and relatively inexpensive way to achieve an acceptable and ordinarily adequate approximate computation of percent accuracy of the tested meter. More complicated counters will compute accuracy exactly, and it is to be understood, therefore, that the principle of the invention is not necessarily limited to a subtractive hook-up at the counter. In such an installation it is simply required that a count of the standard impulses from unit 11 be obtained corresponding to any desired number of revolutions of the meter under test. In the illustrated installation, this number will be on the order of one or two; however, the number should be an aliquot part of a single revolution of the meter under test, i.e., one-half, one, two, etc.

An embodiment of the invention chosen for illustration employs photoelectric viewing means to originate both the measuring or timing impulses at the standard meter 11 or the controlling "start"—"stop" signals at the tested meter 10. This is a convenient and relatively inexpensive arrangement; however, those skilled in the art will appreciate that other devices to originate correspondingly phased impulses and signals are available. It will likewise be appreciated that the use of the frequency multiplier unit 12 is simply an expedient to convert the 500 line disk 16 at standard meter 11 as a source of 1,000 impulses fed to counter 13 to drive the same. An original disk 16 having means to originate the desired 1,000 impulses per disk revolution will, of course, eliminate the need for the frequency doubler 12.

As stated, the photoelectric unit 22, as shown, may originate one or two signals per revolution of the meter disk 21, since meters now on the market have either one or two holes in the disk. A single signal per revolution may be obtained in other ways, as by reflection from a small mirror clipped to its shaft or by a beam of light reflected from the metal disk itself, interrupted once per revolution by non-reflective light, as in the case of the photoelectric unit 28 associated with standard meter 11.

As indicated above, the standard unit 11, when operated by a constant power flow under a constant load, equal amounts of energy being used per unit of time, will originate actual "timing" impulses which are equally spaced in time. However, this may not be true under other operating conditions. Actually, the pulses are inherently "energy" pulses used for timing, and their distinct and individual character is preserved for individual counting. Therefore, it is to be understod that references in the claims to follow to "timing" impulses are to be broadly construed in the sense that they are energy pulses for measuring, phasing, sequencing or controlling by electrically energizing or driving the counter 13 and counted by it over a cycle of operation determined as to duration by the tested meter.

Fig. 2 of the drawings shows a practical switching arrangement for automatically changing loads on the standard and tested meters 11, 10, as well as successively transferring "start"—"stop" signals and timing impulses, respectively, to the several banks of counting tubes 26 of counter 13, and otherwise conditioning the apparatus for a fully automatic, complete test in a single revolution of the tested meter under each of the three loads.

Short duration timing impulses from standard meter 11, amplified, multiplied in frequency, and/or formed in uniform amplitude, as required, are fed to counter 13 through the electronic gate or switch unit 24. There is associated with this unit a set 28' of binary stages, designated A, B, C, in Fig. 2; and each stage will consist of a pair of electronic tubes (not shown) which may for the purpose of discussion be designated T-1 and T-2. The tubes are so interconnected in a known manner that only one tube can conduct at a time. An electrical pulse from the standard 11 can be directed to a binary pair of this type so as to cause its presently non-conducting tube to start conducting, and thereby force its presently conducting tube to become non-conducting. A series of pulses will thus cause alternating conduction by the two tubes so that T-1 is always caused to conduct by, say, odd numbered pulses, and T-2 is caused to conduct by even numbered pulses.

The binary A is connected to the electronic gate component, per se, of the gate and switch 24, this component being specially designated 29' in Fig. 2, so that its gate tube (not shown) conducts when binary tube T-2 conducts, and thereby shorts out the standard impulses and prevents them from reaching the counter 13. The gate 29' is then said to be closed. A pulse now applied to binary A will cause its tube T-1 to conduct and tube T-2 to stop conducting. This opens gate 29' and permits a count to start. Successive "start"—"stop" pulses applied to binary A will thus alternately open and close the electronic gate.

Binaries B and C operate in much the same manner as binary A, except that their output which can be taken from either of their tubes T-1 or T-2, is a short duration pulse suitable for operating still another binary. By thus employing an output pulse from a binary to drive a succeeding binary, it is possible to effect a division by two in the number of pulses.

The output of the binary set 28' is applied also to a conventional motor operated stepper switch 30 controlling like switch decks. These include a deck 31 associated with counter 13 to route standard impulses to its respective banks; a deck 32 associated with the counter banks to reset the same to 2,000; a deck 33 associated with the binaries to reset the same to the desired stage; and a deck 34 associated with heavy load, inductive load and light load relays, as well as a common return, to change load at the units 14, 15, of Fig. 1. The relay lines referred to are represented in common in Fig. 1 by the line 27, and a master starting switch for the motor operated switch 30 is designated 35 in Fig. 2.

A typical cycle of single revolution meter test operations is as follows: With the meter 10 to be tested appropriately positioned and connected, the start switch 35 is closed to energize the stepper switch 30, which advances from "off" to a first test position, for example for heavy load ("H.L.") position. One deck 34 thus routes the standard impulses to a "H.L." relay (not shown) to apply heavy load to the meter under test and to the standard meter 11, which starts both running; another deck 31 routes the standard impulses to the "H.L." row of counter tubes; another deck 33 resets the binaries A, B, C, to the desired state; and deck 32 resets the three counter banks to 2,000.

As indicated in Fig. 2, the "start"—"stop" signals from the tested meter 10 are routed through intermediate binary B of set 28', since it will be assumed that the tested meter 10 is of a type which has two holes 20 in its disk 21 and runs at the same nominal speed as standard meter 11. Since a test must not start until the meter is up to speed, the first signal operates binary B in the direction that does not operate binary A; but the second signal from meter 10 operates binary B in the direction to send a positive pulse to binary A, which then operates and opens the electronic gate 29' of unit 24 to start the count or test. The third signal resets binary B and the fourth signal again operates binary B in the direction to send a positive pulse to binary A, which now operates to close the gate 29' and thus complete a test on heavy load.

The last mentioned positive pulse from binary A, which is the "stop" pulse, also causes the stepper switch 30 to simultaneously advance to its next, inductive or "I.L." position. One of its decks now routes standard impulses to the "I.L." bank of counter tubes, another deck energizes the "I.L." relay (not shown), which changes the load to inductive load, and another deck again resets the binaries. In this case, binary B is reset to the other state, so that the next meter signals will operate binary B in the direction to cause binary A to open gate 29'. This change in resetting is made inasmuch as the meter 10 is at speed, hence it is now not necessary to skip the first signal.

The next meter signal operates binary B in the direction to cause binary A to open the gate as above, the second signal resets binary B, and the third signal stops the count as before, thus completing the "I.L." test.

At this time the stop signal operates the stepper switch 30 through a conventional time delay relay (not shown) which delays its operation long enough for the meter 10 to make almost half a revolution. This is an expedient to save the relatively considerable time it would take to bring the succeeding disk hole 20 into photo tube viewing position at the 10% light load speed; otherwise the light load test is made in the same way as the inductive load test, regarding the sequence of events. In fact, the delay relay is actually placed in the line which operates the "I.L. relay." However, as here described, the same result is achieved.

At the "stop" signal for the light load test, the stepper switch 30 is advanced to its "off" position, which de-energizes the meter and leaves the accuracy for each load displayed on the counter banks until the beginning of the test on another meter.

The above described cycle of operations employed binaries A and B alone to test the meter 10 for a single full revolution of its two-hole disk 21. If the "start"—"stop" signals had been directed to binary A, rather than binary B, the test would be for one-half revolution, and if they had been directed through binary C, the test would have been for two revolutions of disk 21. By the same token, if the meter 10 had but a single hole 20, the tests would be made for one, two or four revolutions. By increasing the number of binaries and with certain interconnections therebetween it is possible to conduct a test run for any desired integral or aliquot (including half) revolutions of the tested meter 10.

Certain possible applications of the principle of an accurate test of a watthour meter in one revolution may not require the automatic features of load selection or changing as described above. For example, in laboratory "acceptance" tests of new types of watthour meters, which as presently performed require a great many multi-revolution tests on a few meters of each type, meter connections and load changing would be done manually. A typical schematic testing layout for the purpose is shown in Fig. 3, in which components corresponding to those described above are designated by corresponding reference numerals.

The reference numeral 37 in Fig. 3 designates an appropriate manual switch for resetting the counter tubes and the binary stages, and for starting the count or test; while the reference numeral 38 conventionally designates a source of selective test loads for the meters 10 and 11.

Since the meter 10 is to be tested under a greater number of load conditions than those described above, it is not practical to maintain the nominal one to one (one to ten for light load) relation of tested to standard meter revolutions. Accordingly a set of additional binaries 36 is provided to permit the counter 13 to count for any desired integral number of revolutions of the meter under test. For such usage it may not be necessary for the counter to compute accuracy by the "subtractive process" described above, and it would act simply as a forward counting electronic counter. To further increase the precision of the test it may also be desirable to derive more that 1,000 impulses per revolution of the standard meter.

The principles of the invention are adapted to the routine shop testing of polyphase watthour meters, in which a large number of tests are required on each meter because of the number of its elements, it consisting in a sense of two or three single phase meters combined into one. For such application the simplified scheme just mentioned provides a desirable alternative to the use of a complex automatic test board. Since it appears feasible to make an elctronic counter unit 13 small enough to be used with a portable standard test meter in the field testing of watthour meters, the principle underlying the system of the invention affords a practical device for use by the "outside" or 'field" tester who periodically tests watthour meters in actual service. The "quick, accurate test in one revolution principle" is equally, indeed especially, applicable to the initial calibration of new meters by the manufacturer.

What I claim as my invention is:

1. Apparatus for testing a watthour meter or like instrument in a time interval of duration in the order of about one revolution of a rotative element thereof, which instrument is adapted to be selectively connected electrically under different electrical loads to rotate said element at different speed rates, including a rate of the order of about 1.8 to 6 seconds per revolution, comprising a standard instrument also adapted to be connected under electrical loading corresponding to said different electrical loads and to be driven at rates in correspondence respectively with said different speed rates of said rotative element, means to derive electrical impulses from said standard instrument at a frequency in the order of 500 of such impulses and above per revolution of said rotative element, a counter and indicator unit, means to connect said unit to said standard instrument, said unit being capable of counting at said frequency impulses derived from said standard instrument, means for deriving from the tested meter "start" and "stop" signals separated by a time interval of duration in the order of about one revolution of said rotative element thereof, means connecting said last named means to said counter and indicator unit to respectively commence and terminate a counting operation of the latter in response to said "start" and "stop" signals, and switching means to automatically and in succession select said different electrical loadings and connect said tested and standard meters for operation thereunder.

2. Apparatus for testing a watthour meter or like instrument in a time interval of duration in the order of about one revolution of a rotative element thereof, which instrument is adapted to be selectively connected electrically under different electrical loads to rotate said element at different speed rates, including a rate of the order of about 1.8 to 6 seconds per revolution, comprising a standard instrument also adapted to be connected under electrical loading corresponding to said different electrical loads and to be driven at rates in correspondence respectively with said different speed rates of said rotative element, means to derive electrical impulses from said standard instrument at a frequency in the order of 500 of such impulses and above per revolution of said element, a counter and indicator unit capable of counting at this frequency, means for deriving from the tested meter "start" and "stop" signals separated by a time interval of duration in the order of about one revolution of said rotative element thereof, means connecting said last named means to said counter and indicator unit to respectively commence and terminate a counting operation of the latter in response to said "start" and "stop" signals, and switching means to automatically and in succession select said different electrical loadings and connect said tested and standard meters for operation thereunder, said last named means including a connection from said standard meter to said counter and indicator unit by which said electrical impulses derived from said standard meter are counted subtractively to afford a direct reading reflecting accuracy of said tested meter.

(References on following page)

References Cited in the file of this patent

UNITED STATES PATENTS

| | | |
|---|---|---|
| 2,241,181 | Bushnell | May 6, 1941 |
| 2,332,300 | Cook | Oct. 19, 1943 |
| 2,586,008 | Davis | Feb. 19, 1952 |
| 2,599,378 | Fleischmann | June 3, 1952 |
| 2,705,303 | Stinger | Mar. 29, 1955 |

FOREIGN PATENTS

| | | |
|---|---|---|
| 507,269 | Belgium | Dec. 15, 1951 |
| 710,488 | Great Britain | June 16, 1954 |
| 724,093 | Great Britain | Feb. 16, 1955 |

OTHER REFERENCES

"A New Test Board for Portable Watt-hour Meter Standards," article in A.I.E.E. transactions (Communications and Electronic), July 1955—pages 367–373.

"Board Speeds Tests on Standards," article in Electrical World, July 4, 1955, pages 44–49.